(12) United States Patent
Myono

(10) Patent No.: US 6,445,243 B2
(45) Date of Patent: Sep. 3, 2002

(54) CHARGE-PUMP CIRCUIT AND CONTROL METHOD THEREOF

(75) Inventor: Takao Myono, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/852,576

(22) Filed: May 10, 2001

(30) Foreign Application Priority Data

May 10, 2000 (JP) ........................................ 2000-137482

(51) Int. Cl.[7] .................................................. G05F 1/10
(52) U.S. Cl. ................................................... 327/536
(58) Field of Search .............................. 327/530, 534, 327/535, 536, 537

(56) References Cited

U.S. PATENT DOCUMENTS

| | | | | |
|---|---|---|---|---|
| 5,043,858 A | * | 8/1991 | Watanabe | 307/110 |
| 5,999,425 A | * | 12/1999 | Lacey et al. | 307/110 |
| 6,008,690 A | * | 12/1999 | Takeshima et al. | 327/534 |
| 6,307,425 B1 | * | 10/2001 | Chevallier et al. | 327/536 |

* cited by examiner

Primary Examiner—Jeffrey Zweizig
(74) Attorney, Agent, or Firm—Fish & Richardson P.C.

(57) ABSTRACT

The charge-pump circuit has at least first and second MOS transistors for charge transfer M1 and M2 connected in series, first and second capacitors 1 and 2, a clock driver 3 supplying clock to one end of the second capacitor 2, first switching means S2 for connecting the first and second capacitors to a pumping node in series, and second switching means S1 and S3 for connecting the first and second capacitors to the pumping node in parallel The clock driver 3 changes the state of clock when both of the first and second switching means turn off.

15 Claims, 8 Drawing Sheets

CHARGE-PUMP CIRCUIT AND CONTROL METHOD THEREOF

BACKGROUND OF THE INVENTION

The present invention relates to a charge-pump circuit outputting voltage fluctuation within a step or power source voltage Vdd and a control method thereof, particularly a control method of a charge-pump circuit capable of normal charging pump operation removing influence of a parasitic diode following to a charge transfer device.

The charge-pump circuit developed by Dicson generates higher voltage than power source voltage Vdd of an LSI chip by voltage fluctuation of each pumping packet connecting plural stages of the pumping packet in series. For example, it is used for generating voltage for program/erase of flash memories.

However, the conventional charge-pump circuit carries out voltage fluctuation with a step of the power source voltage Vdd, and a circuit capable of carrying out voltage fluctuation with lower voltage step than the Vdd was not yet proposed. So, the inventor has already proposed a charge-pump circuit capable of carrying out voltage fluctuation with lower voltage step than the Vdd and improving efficiency η of the circuit (U.S. patent application No. 09/732,944 filed on Dec. 8, 2000).

The outline thereof will be described below. FIG. 10 to FIG. 12 are circuit diagrams showing a structure of an operation of −0.5 Vdd voltage fluctuation charge-pump circuit. The charge-pump circuit generates voltage of voltage fluctuation of −0.5 Vdd to earth voltage (0 V).

In FIG. 10, diodes D1 and D2 are connected in series as charge transfer devices. To a cathode of the diode D1, earth voltage (0 V) is supplied. The diodes D1 and D2 generally consist of MOS transistors for charge transfer in order to integrate into an LSI.

Switches S1, S2 and S3 connect two capacitors 1 and 2 to a connecting point between the diodes D1 and D2 switching in parallel or in series. These switches S1, S2 and S3 can consist of MOS transistors. Thus, on and off of the switches S1, S2 and S3 corresponds to on and off of the MOS transistors. A clock driver 3 supplies clock CLK to the capacitor 2. Output voltage output from the diode 2 is applied to a load 4.

An outline of control method of the charge-pump circuit will be described below. Power source voltage of the clock driver is assumed 5 V. Although forming the diodes D1 and D2 and the switches S1, S2 and S3 actually occurs voltage drop, the voltage drop is assumed 0 V omitting the voltage drop here.

When input clock of the clock driver 3 is high level (CLK=High), assuming that S1 is off, S2 is on and S3 is off, two capacitors 1 and 2 are connected in series and each node voltage is: VL1≈0V, VA=VB=2.5V, VC=5V. VL1 is voltage of a connecting node between the diode D1 and the capacitor 1 (a pumping node), VA is voltage of a connecting node between the capacitor C1 and the switch S2, VB is voltage of a connecting node between the switch S2 and the capacitor 2, and VC is voltage of a connecting node between output of the clock driver 3 and the capacitor 2.

That is, if capacitance values which capacitors 1 and 2 have are equal, capacitors 1 and 2 are respectively charged to voltage of Vdd/2 by distributing equally electric charge to the capacitors 1 and 2 (see FIG. 10).

Next, when S2 is off and S1 and S3 are on in the state of CLK=High, two capacitors 1 and 2 are switched to parallel connection. Thus, each node voltage becomes: VL1≈2.5V, VA=5V, VB=2.5V, VC=5V (See FIG. 11).

Next, when the input clock CLK is transferred to low level (CLK=Low) in the state of the parallel connection, each node voltage becomes: VL1≈2.5V, VA=0V, VB=−2.5V, VC=5V by effect of the capacitor coupling because the capacitors 1 and 2 are connected to the pumping node (See FIG. 12).

Thus, by repeating switching the capacitors 1 and 2 alternately to series and parallel according to the input clock CLK, output voltage of −2.5 V (=(−½)·Vdd) is supplied to the load 4 from the diode D2.

When the diodes D1 and D2 consist of MOS transistors for charge transfer where a source and a gate are connected, there are a problem that needless current flows transitionally by that the diode D1 is biased to forward direction when voltage of the pumping node VL1 becomes 2.5V. Then, in order to avoid the problem, gate voltage of the MOS transistor for charge transfer may be controlled separating from source voltage.

At timing connecting the capacitors 1 and 2 in series, gate voltage of the transistor for charge transfer suitable for the diode D1 is made on by setting low level (see FIG. 10), at timing connecting the capacitors 1 and 2 in parallel, gate voltage of the transistor for charge transfer suitable for the diode D1 is made off by setting high level (see FIG. 11).

However, in the above-mentioned control method of the charge-pump circuit, voltage of the pumping node VL1 repeats change such as 0V→2.5V→−2.5V. Because of that, even if the MOS transistors for charge transfer are any of P-channel and N-channel, a problem occurs that a parasitic diode formed incidentally to the MOS transistors is biased to forward direction and voltage fluctuation is not carried out normally.

FIGS. 13A and 13B are views showing a problem in the case that the diode D1 is made by P-channel MOS transistor as a charge transfer device. In this case, a source S and a substrate B are earthed to improve efficiency of the charge-pump circuit depressing back gate bias effect of the MOS transistor.

As shown in FIG. 13A, there is not any problem in case that voltage of the pumping node VL1 is −2.5V. However, as shown in FIG. 13B, when a parasitic diode formed between a drain and the substrate in the case that voltage VL1 is 2.5V of the pumping node is biased to forward, forward direction current of the diode flows between the drain and the substrate, power efficiency becomes bad, and charge-pump operation is not carried out normally.

FIGS. 14A and 14B are views showing a problem in the case that the diode D1 is made by N-channel MOS transistor as a charge transfer device. In this case, a drain D (pumping node) and a substrate B are connected to depress back gate bias effect of the MOS transistor.

As shown in FIG. 14A, there is not any problem in case that voltage of the pumping node VL1 is −2.5V. However, as shown in FIG. 14B, a parasitic diode formed between the substrate and a source is biased to forward in the case that voltage VL1 is 2.5V. Then, forward direction current of the diode flows between the drain and the substrate, power efficiency becomes bad, and charge-pump operation is not carried out normally.

SUMMARY OF THE INVENTION

An object of the invention is to prevent that the parasitic diode is biased to forward direction and needless current flows, and to make normal operation of the charge-pump circuit possible.

A charge-pump circuit of the invention comprises, at least first and second MOS transistors for charge transfer connected in series, first and second capacitors, clock supplying means supplying clock to one end of the second capacitors, first switching means for connecting said first and second capacitors to a connecting point of the first and second MOS transistors for charge transfer in series, and second switching means for connecting said first and second capacitors to the connecting point of the first and second MOS transistors for charge transfer in parallel, wherein said clock supplying means changes the state of said clock when said first and second switching means turn off.

By such the structure, a timing that the clock is supplied to the capacitor changes to high level from low level (or to low level from high level) is adjusted in the state that both of the first and second switch means are off. In this state, the first and second capacitors are separated from the connecting point (pumping node) of the first and second MOS transistors for charge transfer.

Thus, it is prevented that the parasitic diodes following the first and second MOS transistors for charge transfer are biased to forward direction because change of potential of the pumping node is depressed.

DETAILED DESCRIPTION OF THE INVENTION

Figure 1:
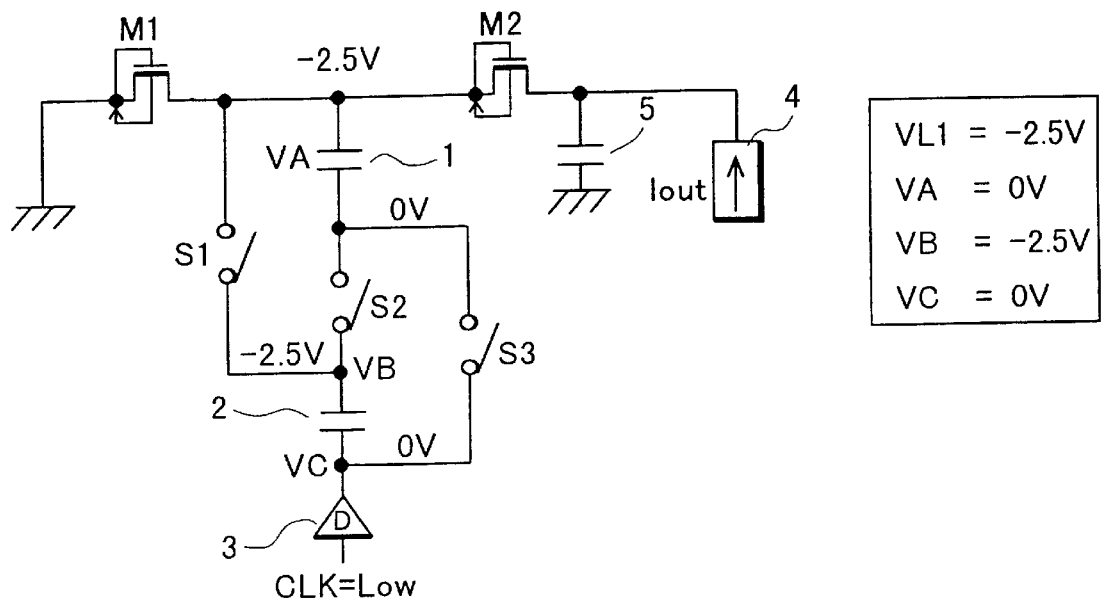
FIG. 1 is a circuit diagram showing a charge-pump circuit and a control method thereof according to an embodiment of the invention.
Figure 2:
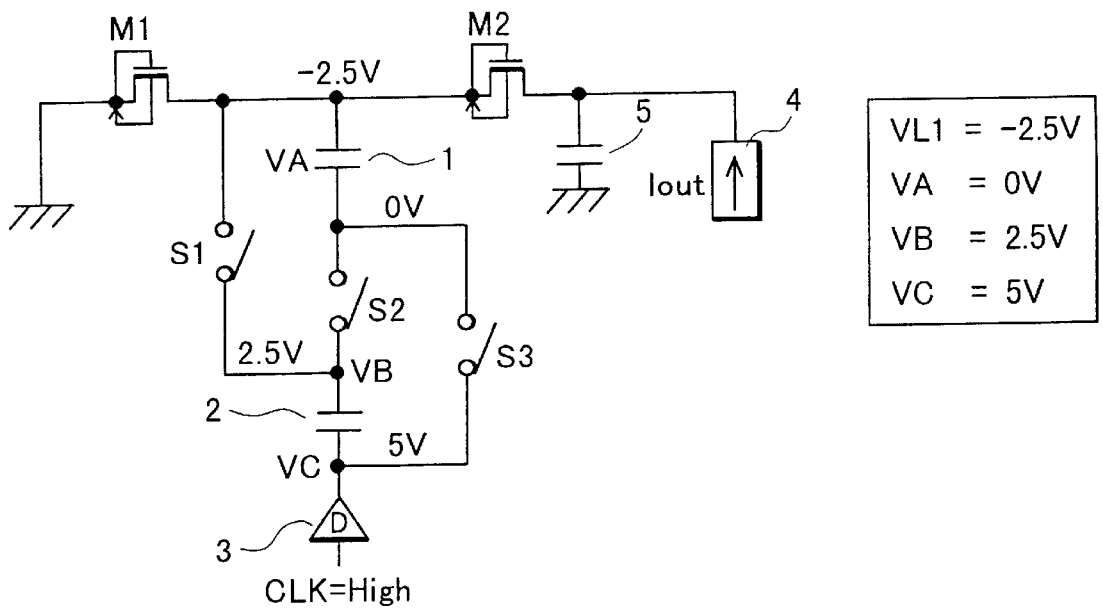
FIG. 2 is a circuit diagram showing a charge-pump circuit and a control method thereof according to an embodiment of the invention.
Figure 3:
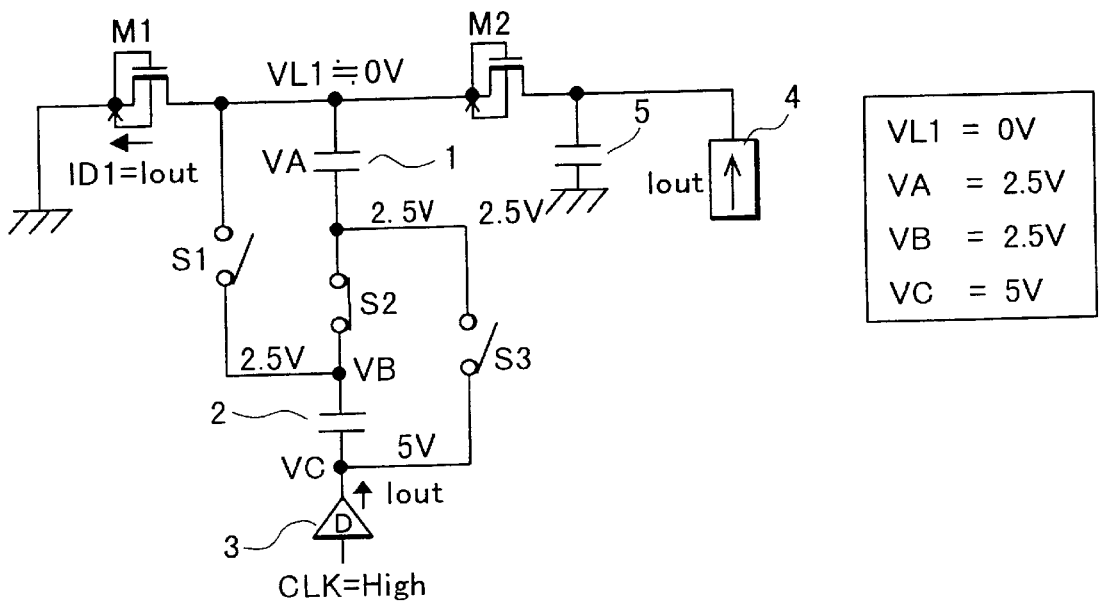
FIG. 3 is a circuit diagram showing a charge-pump circuit and a control method thereof according to an embodiment of the invention.
Figure 4:
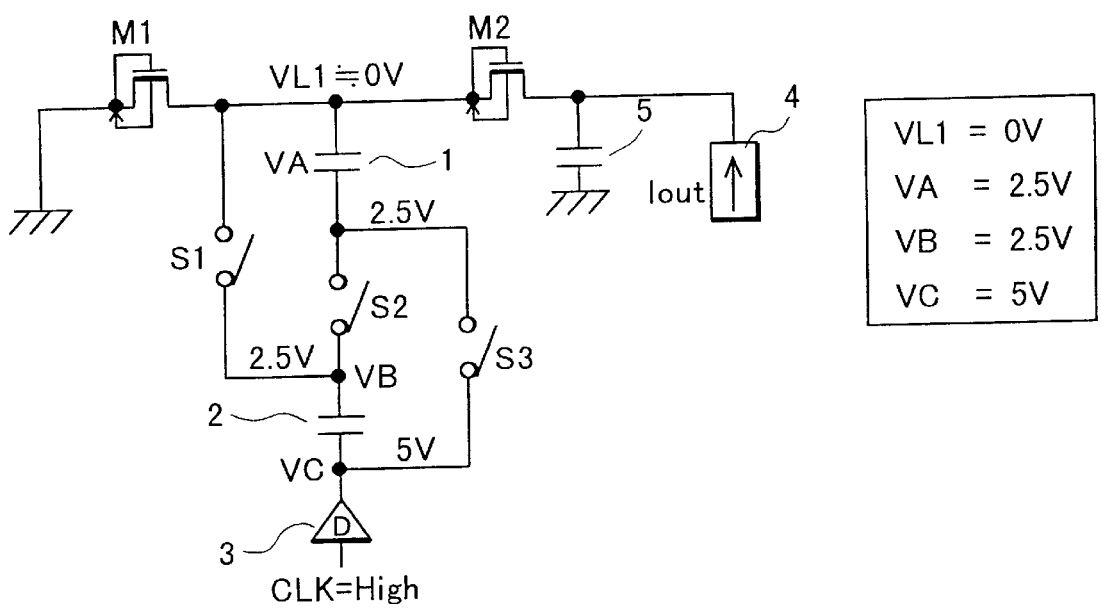
FIG. 4 is a circuit diagram showing a charge-pump circuit and a control method thereof according to an embodiment of the invention.
Figure 5:
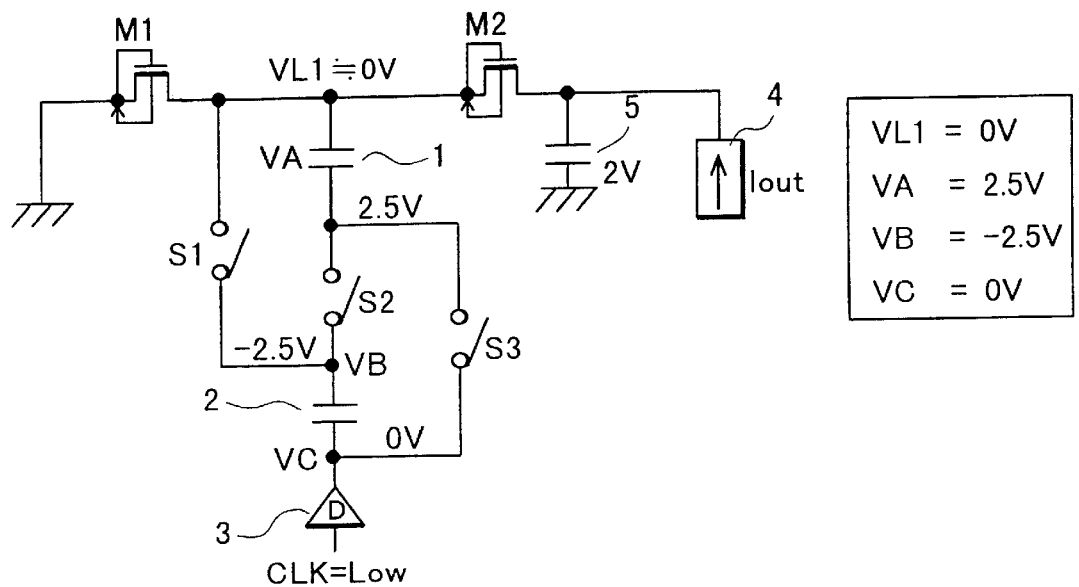
FIG. 5 is a circuit diagram showing a charge-pump circuit and a control method thereof according to an embodiment of the invention.
Figure 6:
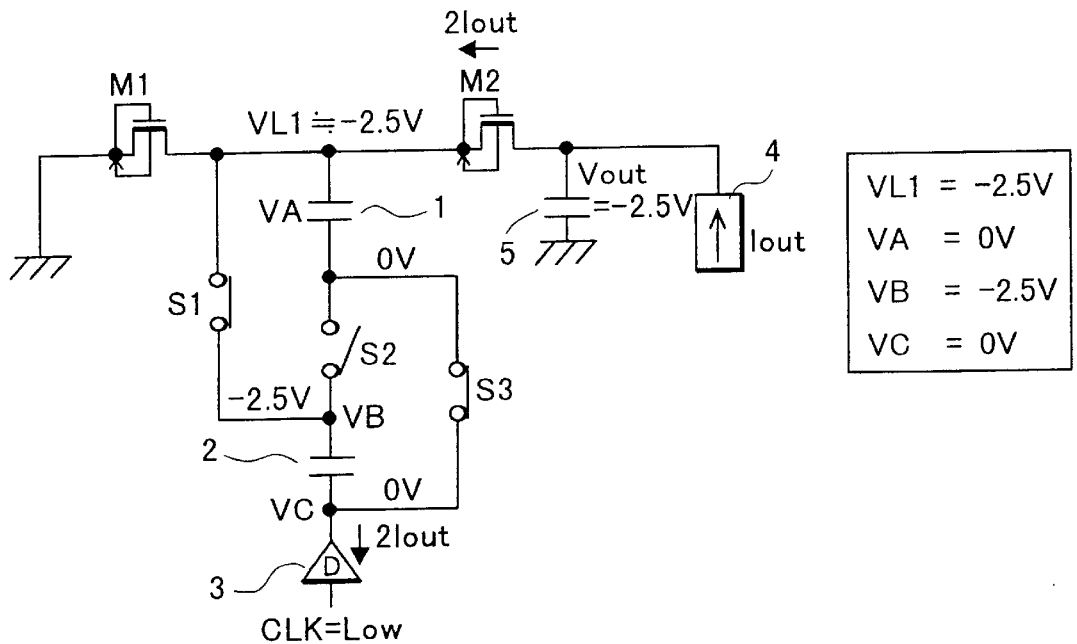
FIG. 6 is a circuit diagram showing a charge-pump circuit and a control method thereof according to an embodiment of the invention.

An embodiment of the invention will be described below with reference to the drawings. FIG. 1 to FIG. 6 are circuit diagrams showing constructions and operations of charge-pump circuits outputting voltage fluctuation of −0.5 Vdd. These charge-pump circuits generate voltage fluctuation of −0.5 Vdd to earth voltage (0 V).

P-channel MOS transistors M1 and M2 are connected in series. The MOS transistors M1 and M2 have constructions where a substrate and a source are connected in order to prevent back gate effect. In the MOS transistors M1 and M2, though it is not limited, for example, a gate and a source are connected so as to construct a kind of diode.

Switches S1, S2 and S3 connect two capacitors 1 and 2 to a connecting point (pumping node) between MOS transistors M1 and M2 switching in parallel or in series. That is, when the switch S2 (first switching means) in on, the MOS transistors M1 and M2 are connected in series, when the switches S1 and S3 (second switching means) are on, the MOS transistors M1 and M2 are connected in parallel.

As described later, the switch S2 and the switches S1 and S3 are controlled so as to repeat on and off alternately in outline. Even these switches S1, S2 and S3 consist of MOS transistors. Thus, on and off of the switches S1, S2 and S3 corresponds to on and off of the MOS transistors.

A clock driver 3 supplies clock CLK to the capacitor 2. The clock driver 3, though it is not especially limited, consists of a CMOS inverter to which power source voltage Vdd is supplied. Output voltage output from a diode D2 is applied to a load 4.

Figure 7:
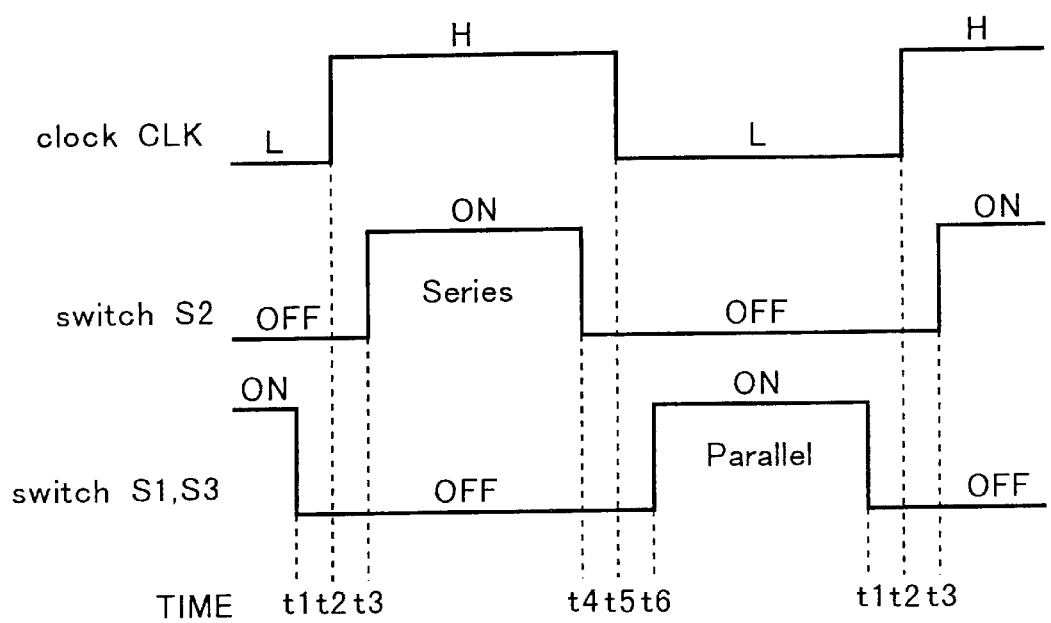
FIG. 7 is a timing chart showing a charge-pump circuit and a control method thereof according to an embodiment of the invention.

A control method of the charge-pump circuit having the above-mentioned construction will be described referring FIG. 1 to FIG. 7. FIG. 7 is a timing chart for describing control method of a charge-pump circuit.

Although it is not limited, it is assumed that power source voltage Vdd of the clock driver 3 is 5 V and capacitor values of the capacitors 1 and 2 are equal. Voltage fall caused by the MOS transistors M1 and M2 and the switches S1, S2 and S3 is described as 0 V.

(1) First Control Step

At time t1, the switches S1 and S2 are off, and all of the switches S1, S2 and S3 become off state. Input clock CLK of the clock driver 3 is low level (CLK=Low). At this state, each node voltage is: VL1≈−2.5V, VA=0V, VB=−2.5V, VC=0V. VL1 is voltage of a connecting node between the diode D1 and the capacitor 1 (a pumping node), VA is voltage of a connecting node between the capacitor C1 and the switch S2, VB is voltage of a connecting node between the switch S2 and the capacitor 2, and VC is voltage of a connecting node between output of the clock driver 3 and the capacitor 2 (see FIG. 1 and FIG. 7).

(2) Second Control Step

Next, at time t2 in the state that all of the switches S1, S2 and S3 are off, the clock CLK is changed to high level from low level. Then, VC changes to 5V and VB changes to 2.5V by effect of capacitor coupling. Voltage of pumping node VL1 does not change because all of the switches S1, S2 and S3 are off (see FIG. 2 and FIG. 7).

(3) Third Control Step

After that, at time t3 in the state that input clock of the clock driver 3 maintains high level (CLK=High), S2 is changed to on. Thus, two capacitors 1 and 2 are connected in series to the pumping node.

Thus, the capacitors 1 and 2 are charged to voltage of Vdd/2, and each node voltage is: VL1≈0V, VA=VB=2.5V, VC=5V. That is, average output current Iout flows through the MOS transistor M1 and further flows from output of the clock driver 3 (see FIG. 3 and FIG. 7).

(4) Fourth Control Step

Next, at time t4 in the state the clock CLK is high, the switch S2 is off. Thus, all of the switches S1, S2 and S3 become again off. Voltage of each node is maintained in the state (see FIG. 4 and FIG. 7).

(5) Fifth Control Step

Next, at time t5 in the state that all of the switches S1, S2 and S3 are off, input clock CLK is changed to low level (CLK=Low). Then, by effect of capacitor coupling, each node voltage is: VL1≈0V, VA=2.5V, VB=–2.5V, VC=0V (see FIG. 5 and FIG. 7).

(6) Sixth Control Step

Next, at time t6 in the state that input clock CLK is maintained low level, S1 and S3 are turned on. Thus, the capacitors 1 and 2 are connected in parallel to the pumping node. Therefore, each node voltage is: VL1≈–2.5V, VA=0V, VB=–2.5V, VC=0V (see FIG. 6 and FIG. 7).

After that, returning to the above-mentioned first control step, the first to sixth steps are repeated.

According to the above-mentioned control method, since voltage of the pumping node VL1 is depressed to 0V in maximum differing from the conventional example, it is prevented that charge-pump operation is not normally carried out because parasitic diode is biased to forward direction and needless current flows.

Figure 8A:
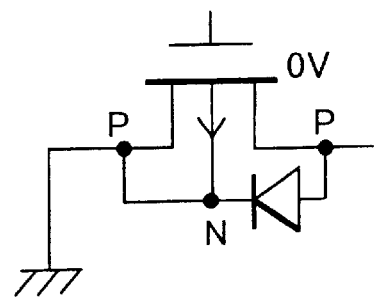
FIGS. 8A and 8B are views showing a case that a charge transfer device is made of a P-channel MOS transistor.
Figure 8B:
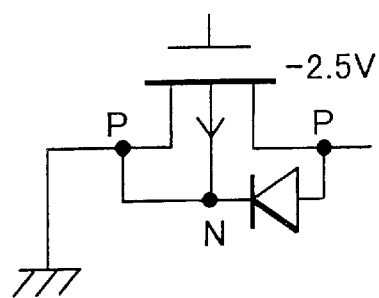

FIGS. 8A and 8B are views showing a case that the charge transfer device is made of a P-channel MOS transistor. In this case, though a source and a substrate are earthed in order to depress back gate bias effect, there is not any problem because the parasitic diode is not biased to forward direction in the any cases that the pumping node is 0V and –2.5V.

Figure 9A:
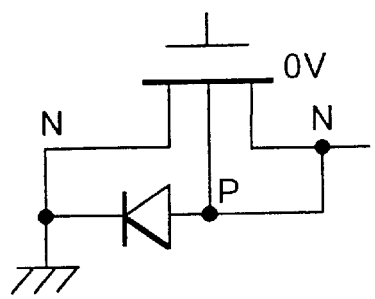
FIGS. 9A and 9B are views showing a case that a charge transfer device is made of an N-channel MOS transistor.
Figure 9B:
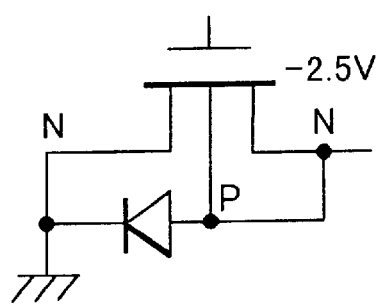
Figure 10:
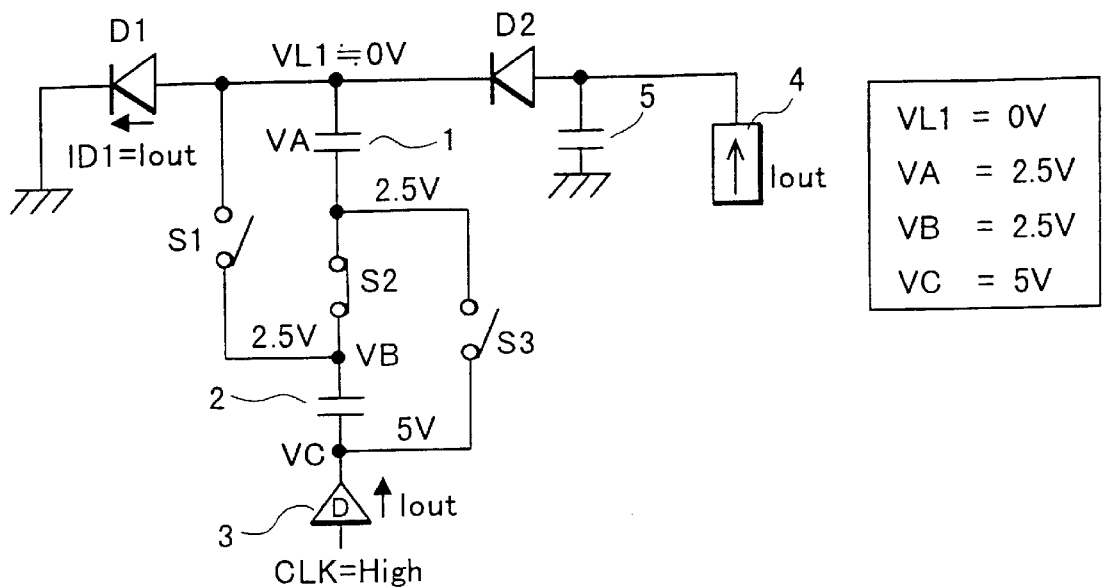
FIG. 10 is a circuit diagram showing a construction.
Figure 11:
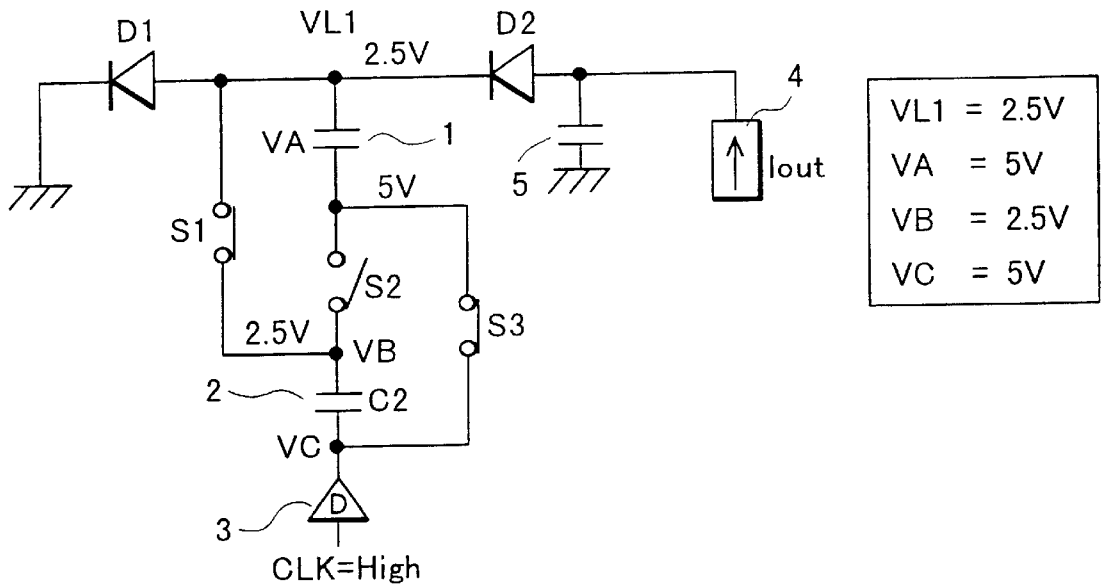
FIG. 11 is a circuit diagram showing a construction and an operation of the conventional charge-pump circuit.
Figure 12:
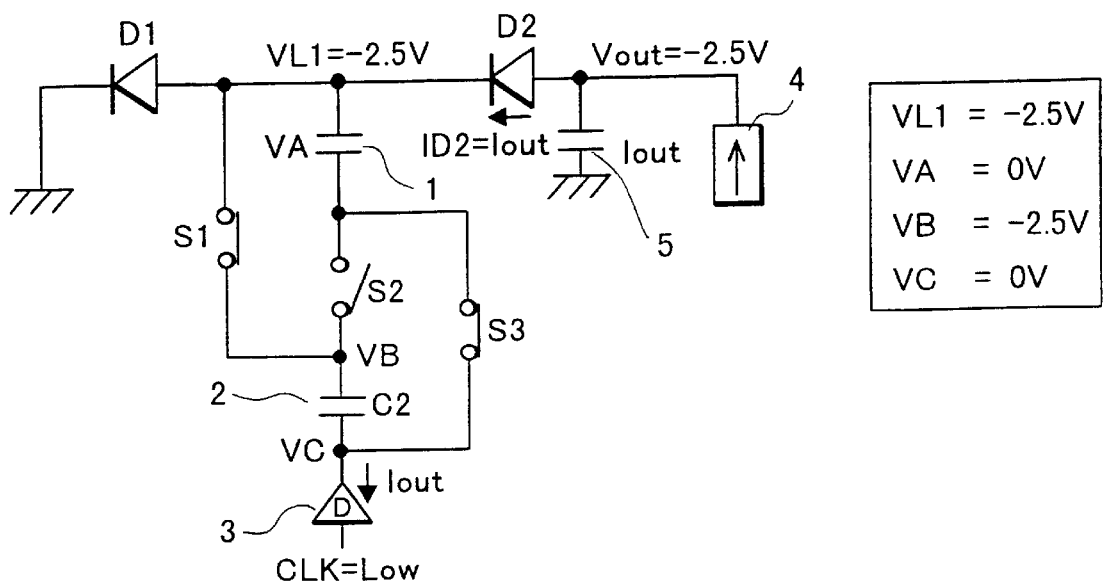
FIG. 12 is a circuit diagram showing a construction and an operation of the conventional charge-pump circuit.
Figure 13A:
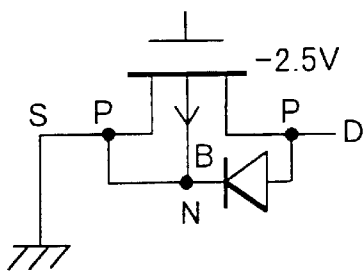
FIGS. 13A and 13B are views showing a problem of the case that a charge transfer device is made of a P-channel MOS transistor.
Figure 13B:
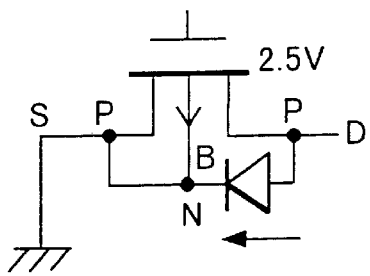
Figure 14A:
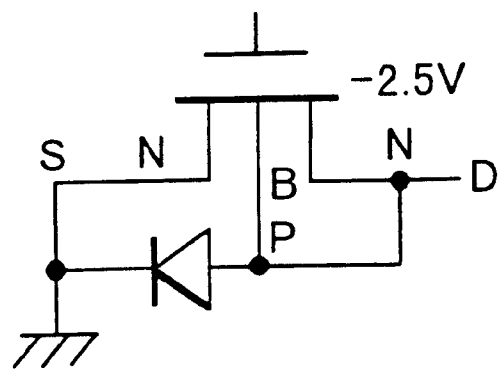
FIGS. 14A and 14B a views showing a problem of the case that a charge transfer device is made of an N-channel MOS transistor.
Figure 14B:
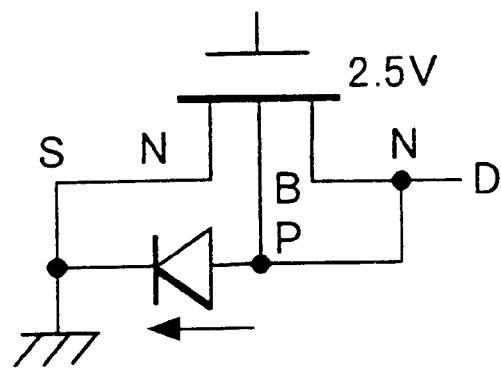

FIGS. 9A and 9B are views showing a case that the charge transfer device is made of an N-channel MOS transistor. In this case, a drain (pumping node) and a substrate are connected in order to depress back gate bias effect. There is not any problem because the parasitic diode is not biased to forward direction in the any cases that the pumping node is 0V and –2.5V.

The charge-pump circuit of the invention, in short wards, the clock CLK from the clock driver 3 is changed at the state that all of the switches S1, S2 and S3 are off (state that the capacitors 1 and 2 are separated from the pumping node) first. Second, after changing the clock CLK to high level, the switch S2 is made on and the capacitors 1 and 2 are connected the pumping node in series. Third, after changing the clock CLK to low level, switches S1 and S2 are made on and the capacitors 1 and 2 are connected to the pumping node in parallel. According to the rule, it is avoided that the parasitic diode following to the MOS transistor is biased to forward direction in the case that the charge transfer device of the charge-pump circuit is made of a MOS transistor.

The construction that the MOS transistors M1 and M2 for charge transfer are diode-connected in the embodiment generates voltage loss suitable for threshold voltage of the MOS transistors M1 and M2. The invention is not limited to this and is applied for a charge-pump circuit in which the MOS transistors M1 and M2 for charge transfer are made on and off alternately in response to the clock CLK and fluctuated voltage (for example, 2 Vdd in absolute value) is supplied to gates thereof when the MCS transistors M1 and M2 for charge transfer are turned on.

In this case, these gate voltages are controlled so that M1 is on and M2 is off during the capacitors 1 and 2 are connected in series and M1 is off and M2 is on during the capacitors 1 and 2 are connected in parallel.

Thus, threshold voltage loss of the MOS transistors M1 and M2 are removed, and a charge-pump circuit with high efficiency and large output current is realized because on resistances of the MOS transistors M1 and M2 are decreased.

Although the MOS transistors M1 and M2 for charge transfer are made of a P-channel MOS transistors in the embodiment, it is not limited to this, is may be made of an N-channel MOS transistor.

Although an applied example for one stage charge-pump circuit outputting boosted voltage of –0.5 Vdd is shown, it is applicable to a two stages charge-pump circuit outputting fluctuated voltage of –1.5 Vdd by increasing number of stage of the charge-pump in the invention. Generally, the invention is applicable to a multi-stages charge-pump circuit assembling the charge-pump circuit of the embodiment as a core. Such the multi-stages charge-pump circuit outputs voltage of –0.5 Vdd at the first stage, and at the second stage or more, the circuit is a general Dicson type charge-pump circuit.

Although the charge-pump circuit of the embodiment is a type carrying out voltage fluctuation of voltage step of –0.5 Vdd changing to two capacitors 1 and 2 to series and parallel, voltage fluctuation of further smaller voltage step can be carried out by changing two or more capacitors to series and parallel. The invention is applicable to such the charge-pump circuit.

Although the charge-pump circuit outputting fluctuated voltage of minus is described in the embodiment, the invention is applicable similarly to a charge-pump circuit having a step of +0.5 Vdd.

According to the charge-pump circuit and the control method thereof of the invention, since it is prevented that the parasitic diode is biased to forward direct on in the charge-pump circuit carrying out voltage fluctuation with a step less than power source voltage by repeating connecting the capacitor to the pumping node in series and in parallel, such the charge-pump operation is carried out normally and the invention has effect improving electric power efficiency.

What is claimed is:

1. A charge-pump circuit comprising:

at least first and second MOS transistors for charge transfer connected in series;

first and second capacitors;

clock supplying means supplying clock to one end of the second capacitor;

first switching means for connecting said first and second capacitors to a connecting point of the first and second MOS transistors for charge transfer in series; and second switching means for connecting said first and second capacitors to the connecting point of the first and second MOS transistors for charge transfer in parallel, wherein said clock supplying means changes the state of said clock while said first and second switching means are turned off.

2. A charge-pump circuit according to claim 1, wherein said first and second capacitors are connected to the connecting point of the first and second MOS transistors for charge transfer in series by turning said first switching means on after said clock changes to a second state from a first state.

3. A charge-pump circuit according to claim 2, wherein said first and second capacitors are connected to the connecting point of the first and second MOS transistors for charge transfer in parallel by turning said second switching means on after said clock changes to the first state from the second state.

4. A charge-pump circuit according to claim 3, wherein said first and second MOS transistors for charge transfer are P-channel MOS transistors.

5. A charge-pump circuit according to claim 3, wherein said first and second MOS transistors for charge transfer are N-channel MOS transistors.

6. A charge-pump circuit comprising:
   at least first and second MOS transistors for charge transfer connected in series;
   plural capacitors;
   clock supplying means supplying clock to these plural capacitors;
   first switching means for connecting said plural capacitors to a connecting point of the first and second MOS transistors for charge transfer in series; and
   second switching means or connecting said plural capacitors to the connecting point of the first and second MOS transistors for charge transfer in parallel,
   wherein said clock supplying means changes the state of said clock while said first and second switching means are turned off.

7. A charge-pump circuit according to claim 6, wherein said plural capacitors are connected to the connecting point of the first and second MOS Transistors for charge transfer in series by turning said first switching means on after said clock changes to a second state from a first state.

8. A charge-pump circuit according to claim 7, wherein said plural capacitors are connected to the connecting point of the first and second MOS transistors for charge transfer in parallel by turning said second switching means on after said clock changes to the first state from the second state.

9. A charge-pump circuit comprising:
   plural MOS transistors for charge transfer connected in series;
   plural capacitors connected to a connecting point of said plural MOS transistors for charge transfer; and
   clock supplying means supplying clock to said plural capacitors,
   wherein the plural capacitors include at least first and second capacitors,
   the charge-pump circuit further comprises:
      first switching means for connecting the first and second capacitors to a connecting point of said MOS transistors for charge transfer in series;
      second switching means for connecting the first and second capacitors to the connecting point of said MOS transistors for charge transfer in parallel, and
      wherein said clock supplying means changes the sate of said clock while said first and second switching means are turned off.

10. A charge-pump circuit according to claim 9, wherein said first and second capacitors are connected to the connecting point of the first and second MOS transistors for charge transfer in series by turning said first switching means on after said clock changes to a second state from a first state.

11. A charge-pump circuit according to claim 10, wherein said first and second capacitors are connected to the connecting point of the first and second MOS transistors for charge transfer in parallel by turning said second switching means on after said clock changes to the first state from the second state.

12. A control method of charge-pump circuit comprising: at least first and second MOS transistors for charge transfer connected in series; first and second capacitors; clock supplying means supplying clock to one end of the second capacitor; first switching means f or connecting said first and second capacitors to a connecting point of the first and second MOS transistors for charge transfer in series; and second switching means for connecting said first and second capacitors to the connecting point of the first and second MOS transistors for charge transfer in parallel,
   said control method comprising a step of changing the state of said clock by said clock supplying means after said first and second switching means are turned off.

13. A control method of charge-pump circuit according to claim 12, further comprising:
   a first step turning said first and second switching means off;
   a second step changing said clock to a second state from a first state by said clock supplying means;
   a third step connecting said first and second capacitors in series by turning said first switching means on;
   a fourth step turning said first switching means off;
   a fifth step changing said clock to the first state from the second state by said clock supplying means; and
   a sixth step connecting said first and second capacitors in parallel by turning said second switching means on,
   wherein said first to sixth steps are repeated.

14. A control method of charge-pump circuit comprising: at least first and second MOS transistors for charge transfer connected in series; plural capacitors; clock supplying means supplying clock to these plural capacitors; first switching means for connecting said plural capacitors to a connecting point of the first and second MOS transistors for charge transfer in series; and second switching means for connecting said plural capacitors to the connecting point of the first and second MOS transistors for charge transfer in parallel,
   said control method comprising a step of changing the state of said clock by said clock supplying means after said first and second switching means are turned off.

15. A control method of charge-pump circuit according to claim 14, further comprising:
   a first step turning said first and second switching means off;
   a second step changing said clock to a second state from a first state by said clock supplying means;
   a third step connecting said plural capacitors in series by turning said first switching means on;
   a fourth step turning said first switching means off;
   a fifth step changing said clock to the first state from the second state by said clock supplying means; and
   a sixth step connecting said plural capacitors in parallel by turning said second switching means on,
   wherein said first to sixth steps are repeated.

* * * * *